United States Patent
Kosugi et al.

(10) Patent No.: US 7,791,587 B2
(45) Date of Patent: Sep. 7, 2010

(54) INPUT APPARATUS, INFORMATION TERMINAL APPARATUS, AND MODE SWITCHING METHOD

(75) Inventors: Ichiro Kosugi, Kanagawa (JP);
Toshiharu Yanagida, Tokyo (JP);
Keiichi Fujinuma, Saitama (JP); Yoshio Okoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 10/547,392

(22) PCT Filed: Mar. 3, 2004

(86) PCT No.: PCT/JP2004/002676

§ 371 (c)(1),
(2), (4) Date: Aug. 31, 2005

(87) PCT Pub. No.: WO2004/090705

PCT Pub. Date: Oct. 21, 2004

(65) Prior Publication Data

US 2006/0170649 A1    Aug. 3, 2006

(30) Foreign Application Priority Data

Mar. 4, 2003  (JP)  ............................. 2003-056529
Feb. 18, 2004 (JP)  ............................. 2004-040742

(51) Int. Cl.
*G09G 5/00*  (2006.01)
(52) U.S. Cl. ...................................... 345/156; 345/169
(58) Field of Classification Search ......... 345/156–184; 348/333.01
See application file for complete search history.

(56) References Cited

U.S. PATENT DOCUMENTS 5,995,083 A * 11/1999 Sato et al. ................... 345/173

(Continued)

FOREIGN PATENT DOCUMENTS

JP         09-044285       2/1997

(Continued)

OTHER PUBLICATIONS

Office Action issued on Oct. 2, 2007 (Japan).

(Continued)

*Primary Examiner*—Amare Mengistu
*Assistant Examiner*—Jennifer Zubajlo
(74) *Attorney, Agent, or Firm*—Rader, Fishman & Grauer PLLC

(57) ABSTRACT

A display portion 3 and a camera portion 4 are disposed in a main body 1. A housing of the main body 1 is made of an non-electroconductive material. One side surface of the main body 1 is an information input surface 5 of an input apparatus. Disposed in the housing on the side surface of the information input surface is a light, thin-film shaped electrostatic sensor. By moving a finger tip 6 on the information input surface 5 upward and downward while contacting thereon, a cursor moves on the display portion 3. Tap positions U, C, and L into which the information input surface 5 is divided in its height direction are defined. When each tap position is lightly tapped one time, releasing and touching states of the finger tip 6 are detected by the sensor and a tap operation is recognized. The tap operation includes a confirmation of a menu at the cursor position, a shutter operation, and so forth. The difference of tap positions can be detected by the sensor.

4 Claims, 11 Drawing Sheets

U.S. PATENT DOCUMENTS

| | | | |
|---|---|---|---|
| 2002/0027547 A1* | 3/2002 | Kamijo et al. | 345/157 |
| 2002/0109672 A1* | 8/2002 | Kehlstadt et al. | 345/157 |
| 2002/0176016 A1* | 11/2002 | Misawa et al. | 348/333.01 |
| 2003/0122779 A1* | 7/2003 | Martin et al. | 345/156 |
| 2006/0232557 A1* | 10/2006 | Fallot-Burghardt | 345/168 |

FOREIGN PATENT DOCUMENTS

| | | |
|---|---|---|
| JP | 10-149254 | 6/1998 |
| JP | 10-198502 | 7/1998 |
| JP | 11-194863 A | 7/1999 |
| JP | 11-194872 A | 7/1999 |
| JP | 2001-100907 | 4/2001 |
| JP | 2001100907 A * | 4/2001 |
| JP | 2001-215288 | 8/2001 |
| JP | 2002-125039 | 4/2002 |
| JP | 2002-215288 | 7/2002 |
| JP | 2002-333951 | 11/2002 |
| JP | 2002333951 A * | 11/2002 |
| JP | 2002-354311 | 12/2002 |

OTHER PUBLICATIONS

International Search Report mailed Jun. 22, 2004.

* cited by examiner

Fig. 7
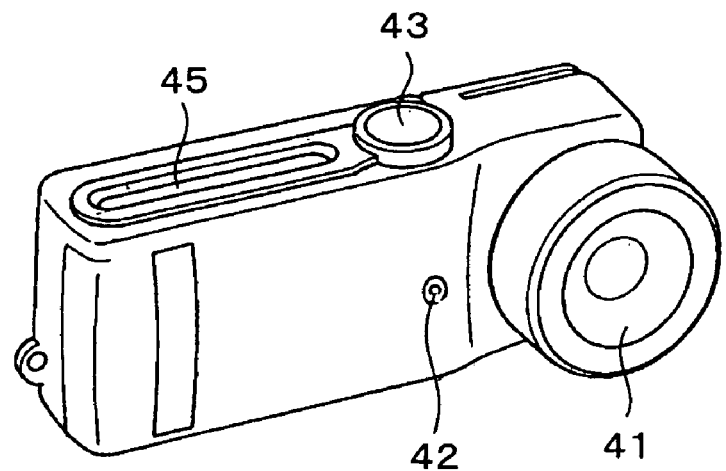
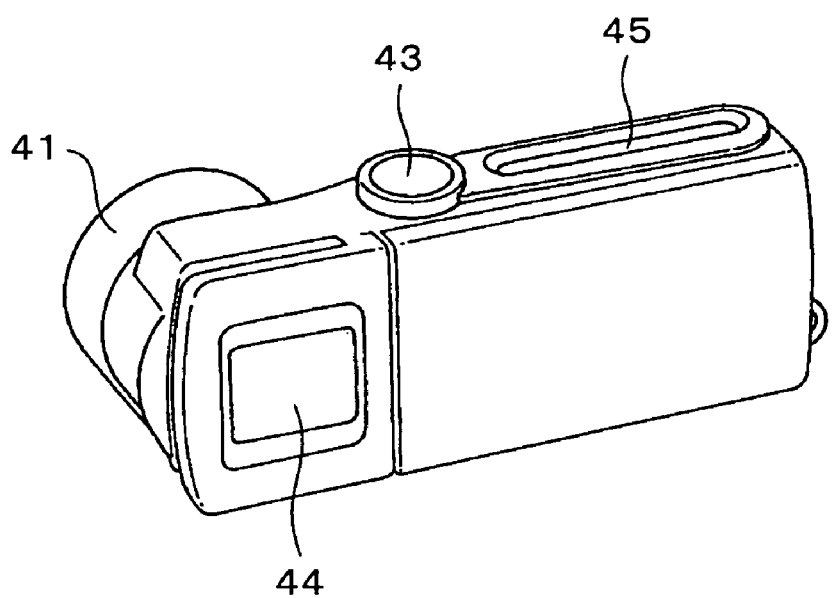

Fig. 11

| SETTING ITEM | MENU ITEM | | | | | |
|---|---|---|---|---|---|---|
| | SCENE SELECTION | SIZE SELECTION | IMAGE QUALITY SELECTION | CONTINUOUS SHOOTING MODE | WHITE BALANCE | FLASH | ... |
| | SCENE SETTING OFF | L SIZE | HIGHEST IMAGE QUALITY | CONTINUOUS SHOOTING OFF | AUTO WB | FORCED LIGHTING | ... |
| | MACRO | M SIZE | HIGH IMAGE QUALITY | CONTINUOUS SHOOTING ON | SUNLIGHT | FLASHING INHIBITION | ... |
| | REAR LIGHT | S SIZE | STANDARD IMAGE QUALITY | | INCANDESCENT LAMP | AUTOMATIC FLASHING | ... |
| | NIGHT SCENE | | | | FLUORESCENT LAMP | | ... |

71

72

INPUT APPARATUS, INFORMATION TERMINAL APPARATUS, AND MODE SWITCHING METHOD

TECHNICAL FIELD

The present invention relates to an input apparatus, an information terminal apparatus, and a mode switching method that allow an user to input a command with the information terminal apparatus.

BACKGROUND ART

Recently, information terminal apparatuses, such as a light-weight palm top type information terminal, a wrist watch type information terminal, a wrist watch type computer, and a small electronic cameras have been proposed. For example, Japanese Patent Laid-Open Publication No. 2002-125039 describes a wrist watch type information terminal.

FIG. 14 shows an appearance of the wrist watch type information terminal described in the related art. As shown in FIG. 14, the wrist watch type information terminal is composed of a main body 101 and a wrist band 102 that is secured to both end portions of the main body 101. Disposed at a nearly center portion on an upper surface of the main body 101 is a display portion 103 that displays various types of information. Disposed at a lower portion on the upper surface of the main body 101 are buttons 104a, 104b, and 104c with which the wrist watch type information terminal is operated. Disposed at a lower portion of the main body 101 is an extension portion 105 that has a plurality of buttons 106 with which information is input.

However, as shown in FIG. 14, since the wrist watch type information terminal is small, the input buttons are small. Thus, it is troublesome to operate the buttons and the user tends to operate the wrist watch type information terminal mistakenly. When the sizes of the buttons are increased, the size of the wrist watch type information terminal becomes large and the design thereof deteriorates. In addition, when the buttons are exposed to the outside of the wrist watch type information terminal, the buttons may be damaged or the design of the terminal may deteriorate.

In a palm top type PDA (Personal Digital Assistance) and so forth, an input operation is performed by tapping a button that appears on a screen with a pen type input device. However, since the pen type input device is separated from the main body, the pen type input device tends to be lost. In addition, when an input operation is performed, both the main body and the pen type input device need to be taken out. Thus, the input operation becomes complicated. In addition, when information is input to the portable information terminal with the pen type input device, it needs to have an information input area on the front surface. Thus, the size of the portable information terminal becomes large and the design thereof deteriorates.

Therefore, an object of the present invention is to provide an input apparatus, an information terminal apparatus, and a mode switching method that allow an input operation to be stably and easily performed without the tradeoffs of an increase of the size and a deterioration of the design.

DISCLOSURE OF THE INVENTION

To solve the foregoing problems, a first aspect of the present invention is an input apparatus for an information terminal device, comprising a position sensor disposed at a part of the outer surfaces of a main body of the information terminal device, wherein the position sensor detects a touching position of a finger on the position sensor and a touching and releasing of the finger to and from the position sensor, and wherein operation signals corresponding to the position of the finger and the touching and releasing operations of the finger are supplied to a controller that controls the information terminal device. As a more practical aspect of the present invention, a sensing portion of the position sensor is housed by a hosing of the main body.

A second aspect of the present invention is an information terminal apparatus, comprising an input device and a controller that controls the information terminal apparatus and receives an operation signal from the input device, wherein the input device includes a position sensor disposed at a part of the outer surfaces of a main body of the information terminal apparatus, wherein the position sensor detects a touching position of a finger on the position sensor and a touching and releasing of the finger to and from the position sensor, and wherein operation signals corresponding to the position of the finger and the touching and releasing operations of the finger are supplied to the controller that controls the information terminal apparatus. As a more practical aspect of the present invention, a sensing portion of the position sensor is housed by a housing of the main body.

A third aspect of the present invention is a mode switching method of an information terminal device having a plurality of modes, each mode having sub setting items, the method comprising the steps of: tracing an upper portion of a position sensor with a finger to switch mode items; touching with the finger a predetermined position on the position sensor and releasing the finger therefrom to switch the setting items; and displaying a screen that indicates a current mode on a display.

According to the present invention, since a sensing portion of a position sensor is disposed at the front surface or a side surface of a main body and an input is performed corresponding to the position of a finger that touches the position sensor and the touching and releasing states of the finger to and from the position sensor, an input apparatus can be structured in a narrow space. According to the present invention, since buttons and so forth do not need to be disposed on the front surface of the housing, buttons can be prevented from being mistakenly pressed in a limited space of the input apparatus. The input apparatus provides high operability without a tradeoff of a deterioration of the design.

In addition, according to the present invention, it is not necessary to use a pen. Thus, while the user wears the input apparatus, he or she can perform an input without the need to consider the storage of a pen. Moreover, since operations that the user, for example, moves and taps his or her finger are sensible, the psychological stress of the input apparatus according to the present invention is much lower than that of a keyboard input or the like.

BRIEF DESCRIPTION OF DRAWINGS

FIG. 7 is schematic perspective views showing a front and a rear of a digital camera according to another embodiment of the present invention.

FIG. 11 is a schematic diagram showing an example of a shoot menu according to the other embodiment of the present invention.

BEST MODES FOR CARRYING OUT THE INVENTION

Figure 1A:
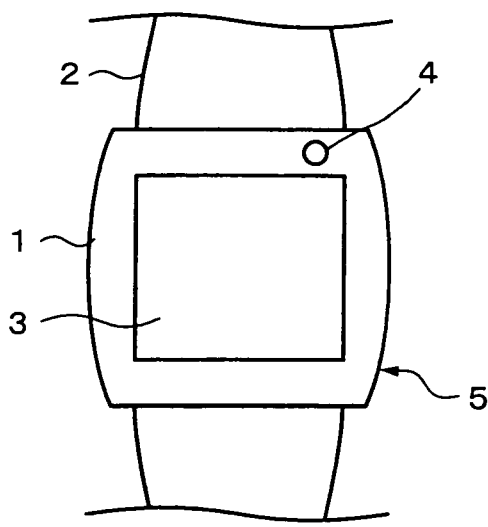
FIG. 1, consisting of FIG. 1A, FIG. 1B and FIG. 1C, is front views showing a wrist watch type portable information terminal according to an embodiment of the present invention.

Next, with reference to the accompanying drawings, an embodiment of the present invention will be described. FIG. 1A is front views showing a wrist watch type information terminal according to the embodiment of the present invention. The wrist watch type information terminal has a main body 1 and a wrist band 2 secured to an upper end portion and a lower end portion of the main body 1. A battery cell as a power source is housed in the main body 1 or the wrist band 2.

Disposed nearly at the center of the main body 1 is a display portion 3, such as a flat display, for example, an LCD (Liquid Crystal Display). Disposed at an upper right portion of the main body 1 is a camera portion 4 composed of an imaging device, such as a CCD (Charge Coupled Device) or a CMOS (Complementary Metal Oxide Semiconductor), and a lens. A housing of the main body 1 is made of a nonconductive material, such as ceramic or plastic.

The front surface except for the display portion 3 of the main body 1 or a side surface at the top, bottom, left, or right of the housing of the main body 1 is a user information input surface. According to this embodiment, a region that is one side surface of the main body 1 and that corresponds to a side surface of the display portion 3 is an information input surface 5 of the input apparatus according to the present invention. Disposed in the housing on the side surface corresponding to the information input surface 5 is a position sensor, for example, an electrostatic sensor, that detects the variation of electrostatic capacitance (hereinafter, this sensor is sometimes referred to as the sensor). The position sensor will be described later.

Figure 1B:
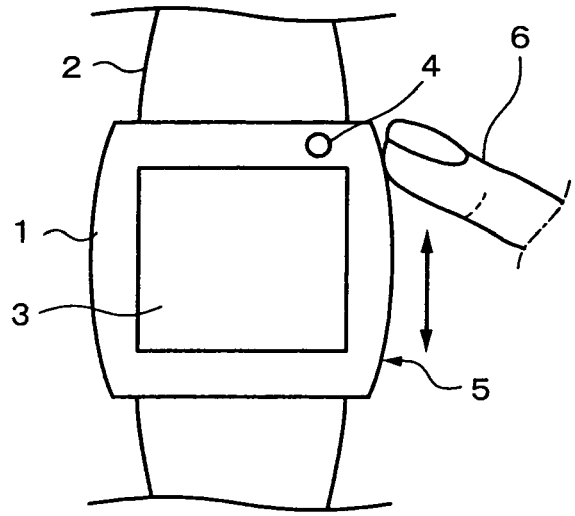

As shown in FIG. 1B, an input operation is performed by moving a finger tip 6 of an index finger of the user in the upper and lower directions on the information input surface 5 while the finger tip 6 is being touched to the information input surface 5. The position of the finger tip 6 is detected by the inner sensor. As will be described later, as the finger tip 6 is moved in the upper and lower directions, a selection position or a cursor is moved in the display portion 3.

Figure 1C:
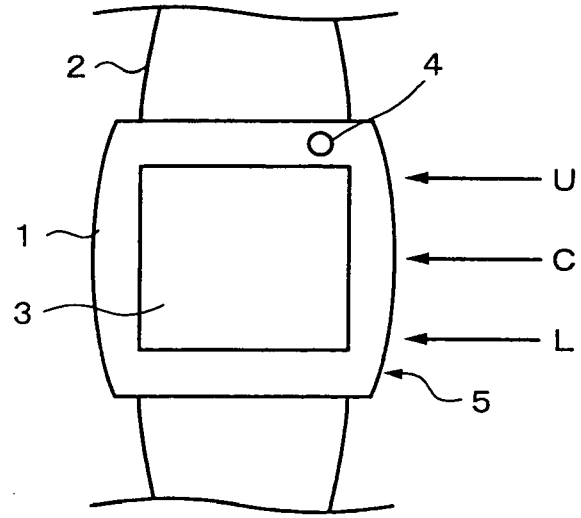

As shown in FIG. 1C, tap positions U, C, and L are defined by the information input surface 5 that is divided into three portions in the height direction thereof. These tap positions are referred to as the up tap position U, the center tap position C, and the low tap position L. When any tap position is lightly tapped, the releasing and touching states of the finger tip 6 are detected by the sensor. As a result, the tap operation is recognized. The tap operation causes a menu to be confirmed at a selected position, a shutter operation to be performed, and so forth. The difference of tap positions can be detected by the sensor. In addition, an operation by which any tap position is tapped two times in a short time may be defined as a tap operation.

Figure 2:
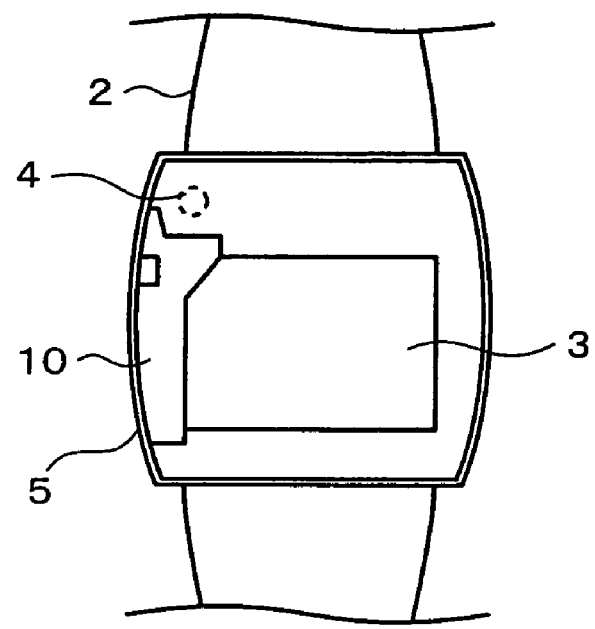
FIG. 2 is a rear view showing the interior of the portable information terminal according to the embodiment of the present invention in the state that a rear cover is removed.

FIG. 2 schematically shows the interior of the main body from which the rear cover has been removed. A box-shaped housing of the main body 1 houses the display portion 3, the camera portion 4, a circuit board that mounts a signal process IC, and so forth. In addition, the housing houses a sensing portion of the sensor 10 disposed along the side surface of the information input surface 5. The sensor 10 is disposed in a space formed between the rear housing and the circuit board (not shown). Since the sensor 10 is light and thin-film shaped, it can be mounted with, for example, a double-adhesive tape.

Figure 3A:
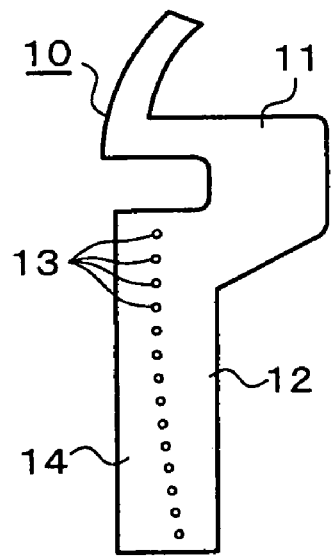
FIG. 3, consisting of FIG. 3A, FIG. 3B and FIG. 3C, is a perspective view and partial enlargement views describing an example of an electrostatic sensor.
Figure 3B:
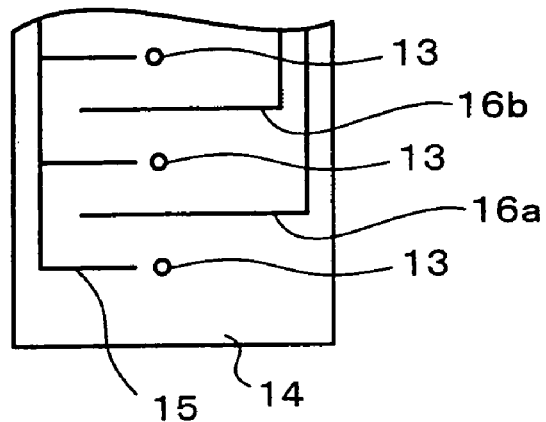

Next, with reference to FIG. 3, an example of the sensor 10 will be described. As shown in FIG. 3A, the sensor 10 is integrally composed of a base portion 11 and a belt-shaped portion 12 that extends from the base portion 11 with a flexible wiring board made from polyimide or the like. FIG. 3A is a view showing the sensor 10 taken from the operation surface. Disposed on the opposite surface of the view shown in FIG. 3A is a component surface.

Disposed on the component surface of the base portion 11 are chip components, such as the signal process IC, a crystal oscillator, resistors, capacitors, and so forth. Formed on the component surface of the belt-shaped portion 12 is an electrode pattern. When ICs are ASICs (Application Specific Integrated Circuits) and paired chips are mounted by flip chip mounting, the sensor 10 is miniaturized and thinly formed.

Figure 3C:
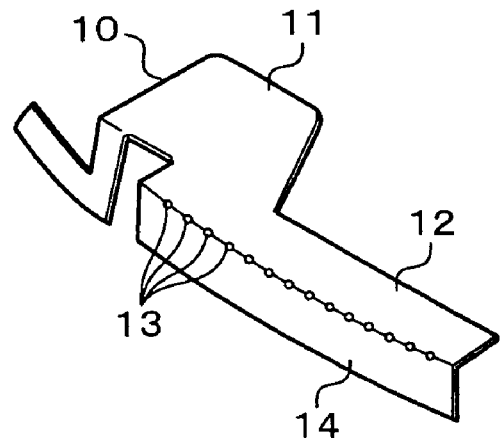

Many small holes 13 are formed at a nearly center position of the belt-shaped portion 12 along a curve in the upper and lower directions of the main body 1. As shown in FIG. 3C, the small holes 13 allow the belt-shaped portion 12 to be easily bent toward the component surface side along the line of the small holes 13 at nearly right angles. Instead of the small holes 13, a slit or a groove may be formed to do that. Alternatively, since the belt-shaped portion 12 has the characteristic of flexibility, the belt-shaped portion 12 may be folded and housed in the main body 1.

A folded portion on the far side of the belt-shaped portion 12 of the base portion 11 is a sensing portion 14. As shown with an enlarged view of FIG. 3B, saw-shaped electrodes are formed on the component surface of the sensing portion 14. In other words, common electrodes 15 are formed at predetermined intervals in the direction in which the sensing portion 14 extends. The common electrodes 15 and detection electrodes 16a, 16b, ... and so forth are alternately disposed. The sensing portion 14 has structure of a one-dimensional position sensor that detects a position in the direction in which the belt-shaped portion 12 extends.

As shown in FIG. 2, the sensor 10 is housed in the main body 1. The sensing portion 14 faces the information input surface 5 on the side surface of the main body 1. Although the housing is disposed between the information input surface 5 and the sensing portion 14, since the thickness of the housing is around 1 mm, the position of the finger tip 6 and the tap operation of the finger tip 6 on the information input surface 5 can be detected by the sensor 10.

The sensing portion 14 of the sensor 10 forms an electrostatic capacitance between adjacent electrodes. When the finger tip 6 approaches the sensing portion 14, the electrostatic capacitance varies. The coordinate position in the one-dimensional direction is detected corresponding to the variation of the electrostatic capacitance. In other words, since the finger tip 6 has electroconductivity, lines of electric force that take place between adjacent electrodes are absorbed by the finger tip. As a result, the electrostatic capacitance varies. Thus, when a part of the electrostatic capacitance of the operation surface varies in the case in which the user touches the information input surface 5 with a metal substance, the position can be detected. However, when the user touches the information input surface 5 with a nonconductive substance (his or her nail, pen, or the like), the position is not detected. The sensor 10 operates according to the same theory as a two-dimensional pointing device (named a touch pad or a track pad).

Figure 4:
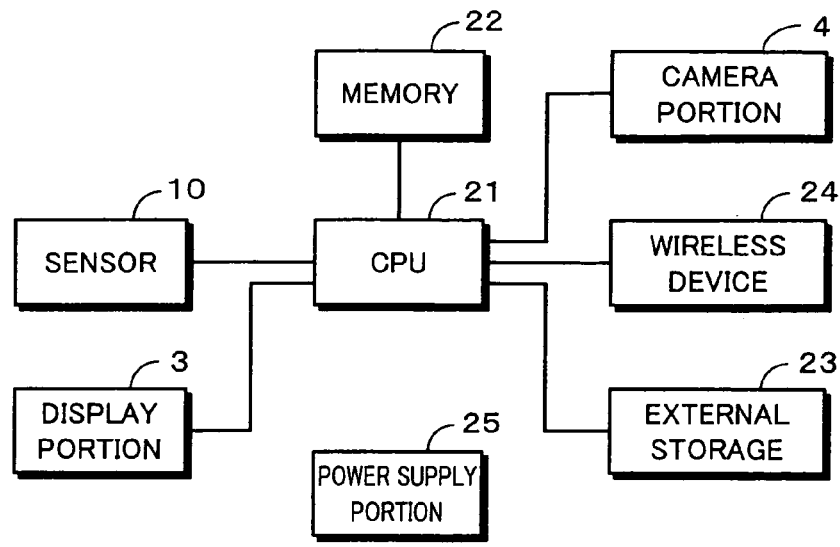
FIG. 4 is a block diagram showing an example of a system structure of the portable information terminal according to the embodiment of the present invention.

FIG. 4 shows an example of a system structure of the information terminal apparatus according to the embodiment of the present invention. As shown in FIG. 4, the information terminal apparatus has a CPU (Central Processing Unit) 21 that controls the entire apparatus. The CPU 21 controls each portion of the apparatus corresponding to a program.

The display portion 3, the camera portion 4, and the sensor 10 are connected to the CPU 21. The display portion 3 displays menus with which the information terminal apparatus is controlled. In addition; the display portion 3 is capable of displaying images shot by the camera portion 4. In addition, a memory 22 that stores a program and that is used as a working area, an external storage 23, and a wireless device 24 are connected to the CPU 21. The external storage 23 is, for example, a removable memory card.

The wireless device 24 is a device that performs a short distance communication corresponding to a Bluetooth system, an IrDA (Infrared Data Association) system, or the like, a wireless LAN (Local. Area Network) communication, a public wireless communication, such as PHS (Personal Handyphone System), or the like. The wireless device 24 has been assigned, for example, an IP address. The wireless device 24 can communicate with another personal computer and an outdoor access point. The wireless device 24 can transmit and receive commands, data, and so forth through a wireless channel. Reference numeral 25 represents a power supply portion composed of a battery, a stabilizing circuit, and so forth.

Figure 5A:
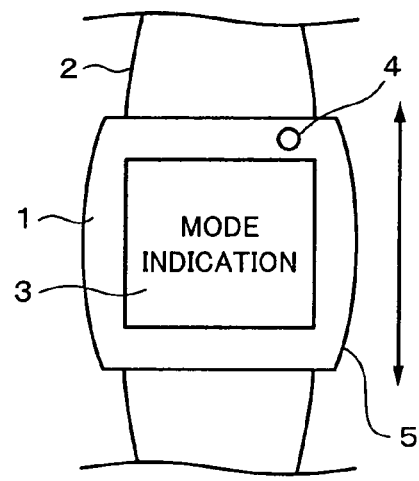
FIG. 5, consisting of FIG. 5A, FIG. 5B and FIG. 5C, is schematic diagrams describing an operation method of the portable information terminal according to the embodiment of the present invention.
Figure 5B:
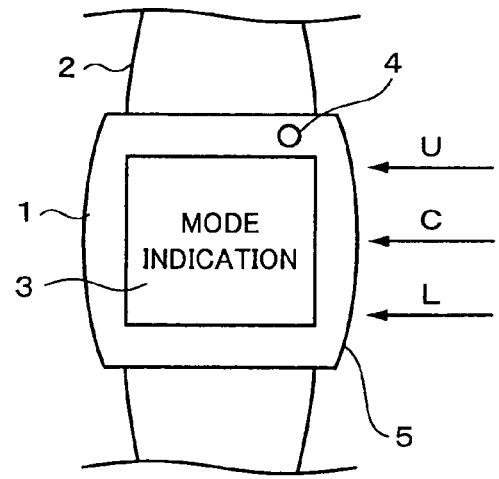

FIG. 5 is schematic diagrams describing an operation method of the wrist watch type information terminal according to the embodiment of the present invention. The operation modes of the wrist watch type information terminal according to the embodiment of the present invention are switched by scrolling or tapping. The scrolling is an operation in which the user traces the information input surface 5 on the side surface of the main body 1 of the wrist watch type information terminal in the upper or lower direction with his or her finger tip. In the following description, the operation that traces the information input surface 5 in the lower direction is called down scrolling. On the other hand, the operation in which the user traces the information input surface 5 with his or her finger tip in the upper direction is called up scrolling. The tapping is an operation in which the user lightly taps the information input surface 5. The tapping is differently recognized depending on the tapped position. In the example, as shown in FIG. 5B, up tap U, center tap C, and low tap L are defined successively in the lower direction of the drawing.

Next, with reference to FIG. 6, an example of the operation of the information terminal apparatus according to the embodiment of the present invention will be described. According to the embodiment, a plurality of operation modes that are camera mode, scheduler mode, electronic mail mode, and so forth can be used. The camera mode is an operation mode in which the apparatus operates as a digital camera that shoots desired objects. The scheduler mode is an operation mode in which the apparatus manages, for example, personal schedules. The mail mode is an operation mode in which the apparatus receives mail from a personal computer through a wireless channel or the like. In each mode, the display portion 3 displays the mode name. First, the user performs a mode selection operation.

Figure 6:
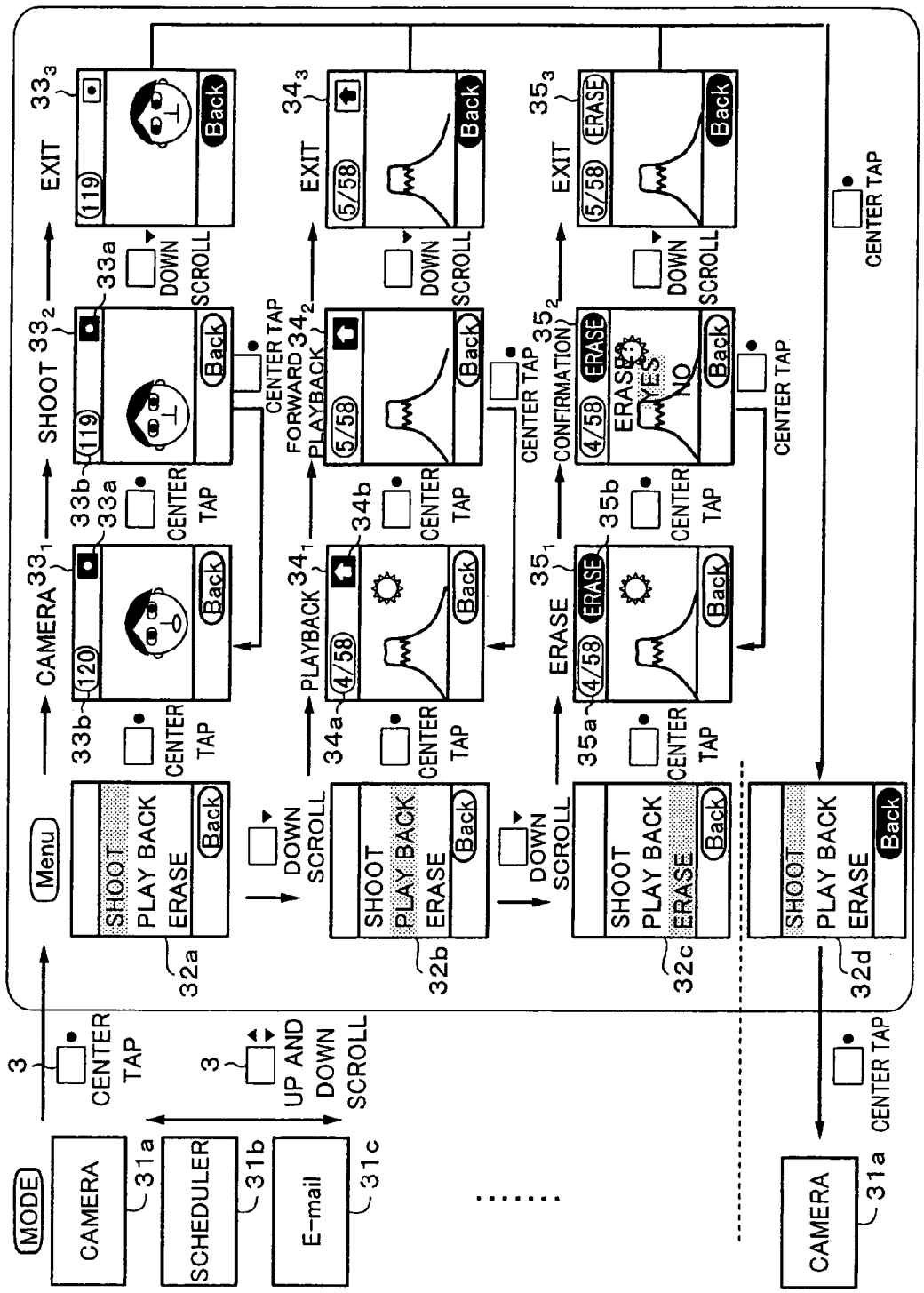
FIG. 6 is a schematic diagram describing an example of an operation of the portable information terminal according to the embodiment of the present invention.

As shown in FIG. 6, when the user scrolls the information input surface 5 by tracing the information input surface 5 with his or her finger tip in the upper or lower direction, a camera mode screen 31$a$, a scheduler mode screen 31$b$, an electronic mail mode screen 31$c$, . . . , and so forth are successively switched. While the desired mode screen appears, when the user taps the center tap, the mode is selected.

While the camera mode screen 31$a$ appears on the display portion 3, when the center tap is tapped, the camera mode is selected. Next, with reference to FIG. 6, the operation of the camera mode will be described. When the center tap is tapped, a camera mode menu screen 32$a$ appears. The camera mode menu screen 32$a$ has menus that are a shoot menu, a playback menu, an erase menu, and back. A selected menu is highlighted, indicated with a reversely indicated cursor, or the like. On the camera mode menu screen 32$a$, the shooting menu has been selected.

When the down scrolling is performed in this state, the cursor moves downward. A playback menu screen 32$b$ and an erase menu screen 32$c$ successively appear. When the down scrolling is performed, a back menu screen 32$d$ appears. While one of the menu screens 32$a$, 32$b$, 32$c$, and 32$d$ appears, when the center tap is tapped, the menu that appears is selected. When the center tap is tapped on the screen 32$d$, the menu screen 32$d$ changes to the camera mode screen 31$a$.

Next, each menu of the camera mode will be described. When the center tap is tapped while the mode menu screen 32$a$ appears, the shooting menu is selected. Thereafter, an image display screen 33$1$ that displays an image shot by the camera portion 4 appears. An indication color of a shutter button 33$a$ on the screen is changed to inform the user that the shooting mode takes place. After the user has checked that the image display screen 33$_1$ appears, he or she taps the center tap. Thus, an object that appears on an image display screen 33$_2$ is shot. After the object has been shot, when the center tap is tapped, the shot image appears for a predetermined time period, for example, three seconds. Whenever the center tap is tapped, the shutter button 33$a$ is pressed. As a result, images are shot. Reference numeral 33$b$ represents an indication that represents the remaining number of images that can be shot.

An image shot by the camera portion 4 is compressed when necessary and then stored in the external storage 23. When an image that was shot is reproduced, image data are read from the external storage 23. When the image data have been compressed, they are decompressed and then displayed on the display portion 3. An image that was shot may be stored in an internal flash memory instead of an external storage.

To exit from the shooting menu, while an image display screen such as the image display screen 33$_2$ has been selected, the down scroll is performed. On a screen 33$_3$, a "Back"

button is selected and the center tap is tapped. When the center tap is tapped, the shooting menu exits to the menu screen 32d.

While the menu screen 32b appears, when the center tap is tapped, a screen $34_1$ appears. On the screen $34_1$, a playback image, an image index 34a, and a forward button 34b appear. The image index 34a indicates the image number of the image that appears on the screen in all images that were shot. The forward button 34b is a button that causes images that were shot to be displayed one by one. While the screen $34_1$ appears, when the center tap is tapped, a screen $34_2$ for the next image that was shot appears. Whenever the center tap is tapped, images that were shot appear forward one by one.

To exit from the playback menu, while a playback image display screen, such as the image display screen $34_2$, appears, the down scroll is performed. On the screen $34_3$, the "Back" button is selected and the center tap is tapped. When the center tap is tapped, the playback menu exits and the menu screen 32d appears.

When the erase menu is selected on the menu screen 32c and the center tap is tapped, the erase menu appears on a screen $35_1$. On the screen $35_1$, a playback image, an image index 35a, and an erase button 35b appear. The image index 35a represents the image number of the image that appears on the screen in all the images that were shot. While the screen $35_1$ appears, when the center tap is tapped, an erase confirmation screen $35_2$ appears. On the erase confirmation screen 352, a message "Will you erase this image?" and buttons "YES" and "NO" appear. To erase the image on the screen, the button "YES" is selected. To not erase the image on the screen, the button "NO" is selected. When the center tap is tapped, the selection operation is executed. Thereafter, the erase confirmation screen for the next image appears.

To exit from the erase menu, while an erase confirmation screen such as an erase confirmation screen $35_2$ appears, the down scroll is performed. On a screen $35_3$, the "Back" button is selected and the center tap is tapped. When the center tap is tapped, the erase menu exits and then the menu screen 32d appears.

While the menu screen 32d appears, when the center tap is tapped, the mode screen 31a appears.

Next, another embodiment of the present invention will be described. FIG. 7 shows appearances of the front and rear of a miniature digital camera according to the present invention. The size of the miniature digital camera, (width×depth× height, excluding the maximum protrusion), is (69.1×16.8× 24) (mm). Since the miniature digital camera is small, it can be pinched with fingers. The miniature digital camera uses a thin lithium ion battery cell as a power supply.

A power supply switch 42 is disposed beside a shooting lens 41 that protrudes from the front of the case. A shutter switch 43 is disposed above the case. Even if the power supply switch 42 has been turned off, when the shutter switch 43 is pressed, the power is immediately turned on and the user can shoot objects.

Figure 8:
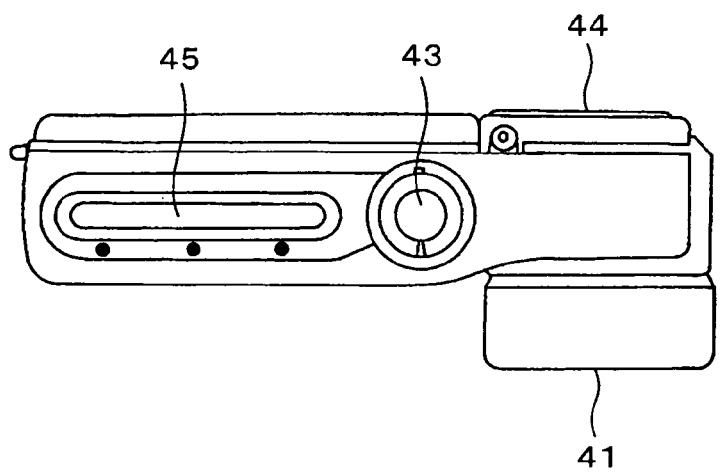
FIG. 8 is a plan view showing a top of the other embodiment of the present invention.

A LCD display 44 is disposed at the rear of the case. The LCD display 44 has a size of, for example, 0.44 inches. The LCD display 44 displays an image that can be shot, a playback image that is read from a medium such as a memory card, and images of menus and various modes. As an input device, disposed above the case and beside the shutter button 43 is a touch pad 45, as shown with a plan view of FIG. 8. Markers of both end positions and the center position are formed in the vicinity of the touch pad 45.

Figure 9A:
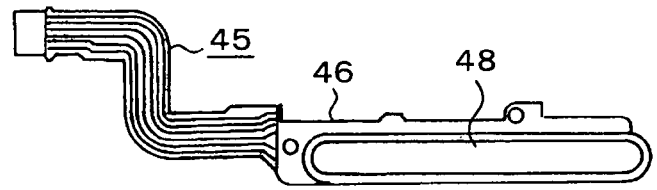
FIG. 9, consisting of FIG. 9A, FIG. 9B and FIG. 9C, is a plan view and a rear view showing a structure of a touch pad according to the other embodiment of the present invention.
Figure 9B:
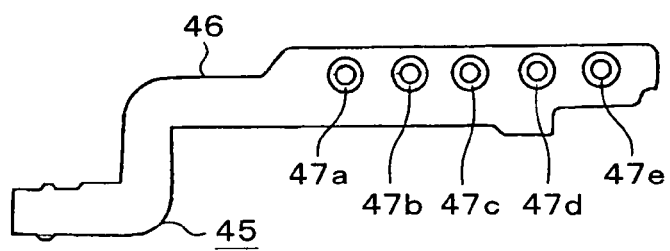

FIG. 9 shows only the touch pad 45. FIG. 9A shows the touch pad 45 viewed from the top of the case. FIG. 9B shows the rear of the touch pad 45 shown in FIG. 9A. The touch pad 45 is composed of a flexible wiring board 46, a plurality of (for example, five) pressure sense switches 47a, 47b, 47c, 47d, and 47e arranged in a row on the flexible wiring board 46, and a resin sheet 48 that coats the pressure sense switches 47a to 47e. The wiring portion of the flexible wiring board 46 is folded when necessary and housed in the case.

The pressure sense switches 47a to 47e are arranged from the left in the state that the user holds the digital camera with his or her fingers. Any one of the pressure sense switches 47a to 47e can be pressed with a finger of the user through the resin sheet 48. The pressure sense switches 47a to 47e have, for example, pressure sense contacts whose contact resistance values continuously vary corresponding to the press force. When the user applies predetermined amounts of force to the pressure sense switches 47a to 47e through the resin sheet 48 with his or her finger tip, they are turned on. The on and off states of the pressure sense switches 47a to 47e are transferred to a circuit portion (control portion) disposed in the case.

Figure 10:
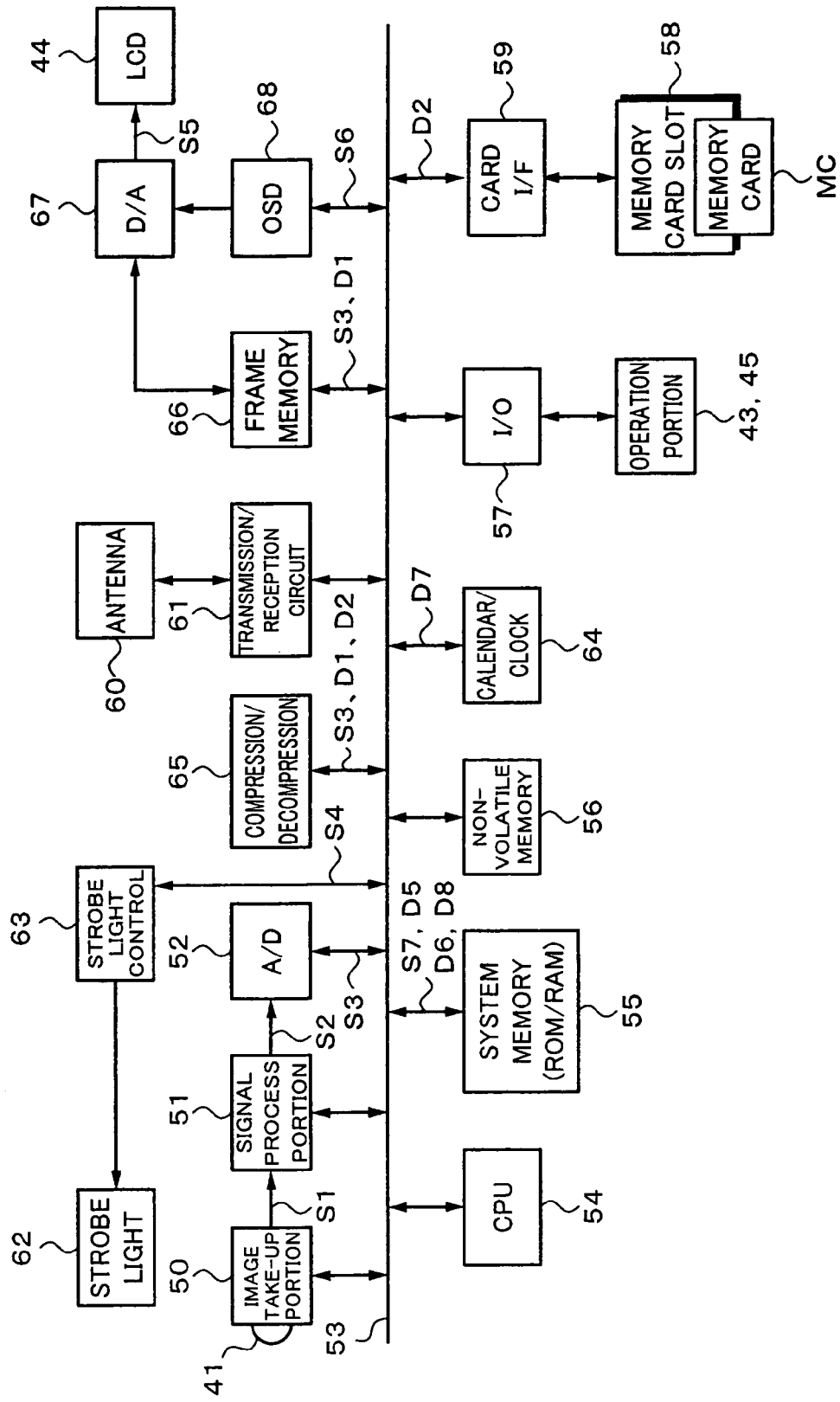
FIG. 10 is a block diagram showing an electric structure of the other embodiment of the present invention.

FIG. 10 shows a structure of a circuit portion of the digital camera. Reference numeral 50 represents, for example, an image take-up portion composed of, for example, a CCD (Charge Coupled Device). An object image enters the image take-up portion 50 through the shooting lens 41. An image take-up signal S1 is input from the image take-up portion 50 to a signal process portion 51. The signal process portion 51 has a CDS (Correlated Double Sampling) and an AGC. The CDS clamps the signal level of the image take-up signal S1 to a predetermined voltage in the period of occurrence of reset noise in the image take-up signal S1 so as to decrease the noise component. The AGC automatically adjusts the amplitude of the image take-up signal S1.

In addition, the signal process portion 51 performs processes such as Y/C separation, gamma compensation, and white balance for the image take-up signal S1. The signal process portion 51 performs a matrix process to generate a video signal S2. The video signal S2 is converted into a digital video signal S3 by an A/D converter (analog to digital converter) 52.

The digital video signal S3 is output to a bus 53. The bus 53 is connected to a CPU (Central Processing Unit) 54. A control signal, address data, video data, and so forth are transferred through the bus 53. The CPU 54 controls all the operations of the digital camera.

Connected to the bus 53 are a system memory 55, a non-volatile memory 56, an I/O port 57, and a card interface 59. The system memory 55 contains a ROM that stores a program and so forth and an RAM that is a work area in which a program is executed. After the power is turned off, the non-volatile memory 56 stores various constants for operations of the digital camera.

The I/O port 57 transfers operation signals received from an operation portion (the shutter button 43 and the touch panel) to the CPU 54 through the bus 53. A memory card MC can be attached to a memory card slot 58. Data are exchanged between the memory card MC attached to the memory card slot 58 and the CPU 54 through the card interface 59.

An antenna 60 and a transmission and reception circuit 61 compose a GPS (Global Positioning System). However, the function of the GPS is optional. Thus, the GPS is not always disposed. A strobe light can be attached to the digital camera. The strobe light designated by reference numeral 62 is controlled by a strobe light control portion 63. The strobe light control portion 63 is connected to the CPU 54 through the bus 53. A control signal S4 is supplied from the CPU 54 to the strobe light control portion 63. Depending on a user's setting, an operation of automatic flash, flash on, or flash off is performed.

A calendar/clock portion 64 is connected to the bus 53. The calendar/clock portion 64 manages recorded dates and times, remaining battery service life, and so forth. The recorded dates and times are added to images that were shot. The remaining battery service life and so forth are calculated.

The digital video signal S3 is supplied from the A/D converter 52 to a compression/decompression portion 65. The compression/decompression portion 65 compresses data in accordance with, for example, JPEG (Joint Photographic Experts Group). The compressed video data are written to a frame memory 66. An analog video signal is supplied to the LCD display 44 through a D/A converter (digital to analog converter) 67. The LCD display 44 displays an image that is being shot.

When the user presses the shutter button 43, the CPU 54 reads image data D1 that is shot when the shutter button 43 is pressed and supplies the image data D1 to the compression/decompression portion 65 through the bus 53 while writing the digital video signal S3 to the frame memory 66. An output of the frame memory 66 is supplied to the LCD display 44 through the D/A converter 67 and displayed on the LCD display 44.

The compression/decompression portion 65 compresses the take-up image data D1 read from the frame memory 66 in accordance with, for example, the JPEG system and outputs compressed image data D2. The compressed image data D2 are output to the memory card slot 58 through the card interface 59 under the control of the CPU 54 and written to the memory card MC.

When the user operates the operation portion (touch panel 45) and sets a mode, the CPU 54 sends a control signal S6 to an OSD portion 68. The OSD portion 68 outputs an image of a pattern corresponding to each mode (namely, an icon image). The icon image is superimposed with an image on the LCD display 44 through the D/A converter 67.

Figure 12:
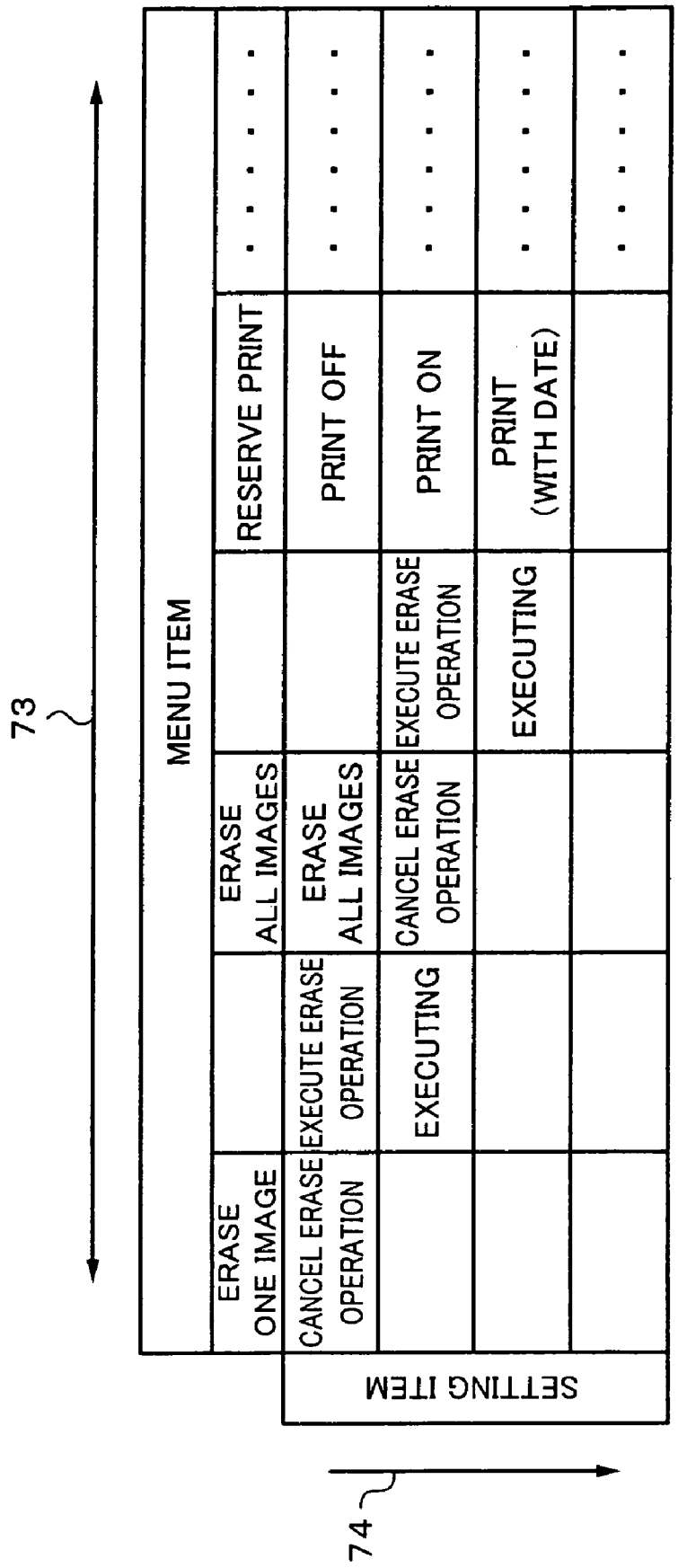
FIG. 12 is a schematic diagram showing an example of a playback menu according to the other embodiment of the present invention.

Next, with reference to FIG. 11 and FIG. 12, an example of mode switching according to the other embodiment of the present invention will be described. FIG. 11 shows a table of examples of shooting menus. FIG. 12 shows a table of examples of playback menus. These menus matrix a plurality of setting items. Each menu item has setting items. For example, the menu item "image quality selection" has the item "high image quality." Menu items and setting items are switched by operating the touch pad 45 in different manners. The menu is displayed on the LCD display 44 by pressing both the end portions of the touch pad 45 (the pressure sense switches 47*a* and 47*e*) at the same time. By switching menu items and setting items, a desired menu is selected. While the desired menu appears on the LCD display 44, both the end portions (the pressure sense switches 47*a* and 47*e*) are pressed at the same time. As a result, the menu disappears and the setting item that last appeared in a plurality of setting items becomes valid.

In the table of the shooting menu shown in FIG. 11, menu items are switched one by one in the horizontal direction denoted by arrow mark 71. Setting items are switched one by one in the vertical direction denoted by arrow mark 72 (from up to down). By tracking the touch pad 45 with a finger tip from left to right, menu items are switched one by one in the direction denoted by arrow mark 71. Whenever the center portion (the pressure sense switch 47*c* at the center position) is tapped by a finger tip, setting items are switched one by one.

When high image quality is selected as a menu item, as the initial setting item, a default item or the preceding (latest) setting item appears on the LCD display 44. The menu item can be changed by tapping the center portion of the touch pad 45. Another menu item, for example, "white balance" can be set by tracing a finger tip on the touch pad 45, for example, rightward. As a result, the menu item "white balance" is selected. A default item or the preceding setting item appears. The menu item "sunlight" may be switched to "fluorescent lamp" by pressing the center pressure sense switch 47*c* on the touch pad 45 two times. While "fluorescent lamp" appears on the LCD display 44, by pressing both the end portions (the pressure sense switches 47*a* and 47*e*) of the touch pad 45 at the same time, the menu disappears and the setting item "fluorescent lamp" that last appeared becomes valid.

Figure 13:
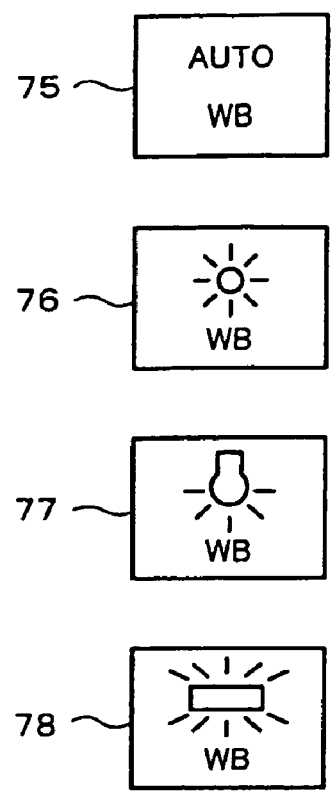
FIG. 13 is a schematic diagram showing real examples of menu indications of the other embodiment of the present invention.
Figure 14:
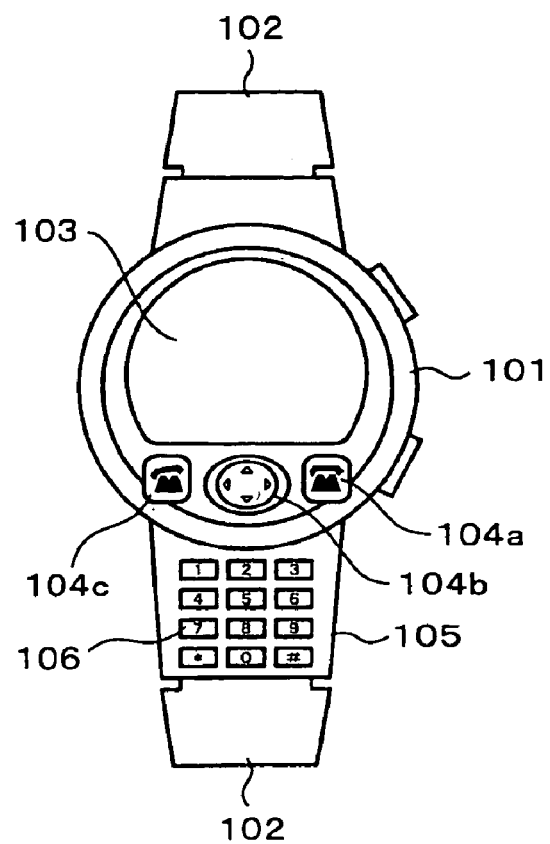
FIG. 14 is a front view showing an appearance of a conventional wrist watch type terminal apparatus.

Actually, as shown in FIG. 13, icon images that represent menu items appear on the LCD display 44. FIG. 13 shows setting items of the menu item "white balance."

When the white balance mode is selected, a screen 75 appears on the LCD display 44. In the white balance mode, a "sunlight" mode screen 76, an "incandescent lamp" mode screen 77, and a "fluorescent lamp" mode screen 78 appear. Likewise, in other modes, respective mode screens appear that are omitted.

The setting switching operation for the table of the playback menu shown in FIG. 12 is the same as that for the shooting menu. By tracing the upper portion on the touch pad 45 leftward and rightward, menu items are switched one by one as denoted by arrow mark 73. In each menu item, whenever the center pressure sense switch 47*c* is pressed, the menu items are switched one by one from top to bottom as denoted by arrow mark 74. When a desired menu item is selected, a default setting item or the preceding (latest) setting item appears on the LCD display 44.

"Erase one image" or "erase all images" are menu items with which image data of the memory card MC are erased. When an erase operation is performed, the menu item "execute erase operation" that asks whether the user will execute the erase operation appears. When menu item "execute erase operation" is selected, the erase operation is executed. At this point, the "executing" icon that represents that the erase operation is being executed appears on the LCD display 44. Like the shooting menu, while a desired menu appears on the LCD display 44, by pressing both the end portions (the pressure sense switches 47*a* and 47*e*) of the touch pad 45 at the same time, the menu disappears and the setting item that last appeared becomes valid.

When the pressure sense switch 47*a* at the left end of the touch pad 45 is continuously pressed, the remaining battery life and the remaining number of images that can be shot appear.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, the present invention can be applied to sensors that can detect the position of a finger, for example, touch switches that are turned on when a finger tip touches them, other than electrostatic type position sensors and pressure sense switches. In addition, the present invention can be applied to wearable information terminal apparatuses, such as necklaces, finger rings, and bracelets as well as wrist watches. In addition, the present invention can be applied to PDA type or portable telephone type information terminal devices.

DESCRIPTION OF REFERENCE NUMERALS

1 MAIN BODY
3 DISPLAY PORTION

4 CAMERA PORTION
5 INFORMATION INPUT SURFACE
6 FINGER TIP
10 SENSOR
14 SENSING PORTION
41 SHOOTING LENS
43 SHUTTER SWITCH
44 LCD DISPLAY
45 TOUCH PAD
47a TO 47e PRESSURE SENSE SWITCH

The invention claimed is:

1. An input apparatus for an information terminal having a display monitor and a controller for controlling the display monitor with the display monitor displaying a plurality of menu items and a plurality of submenu items, and each menu item providing a category label for a subset of submenu items, each submenu item having at least one operation function associated therewith, the input apparatus comprising:
- a sensor extending at least substantially along one side surface of the display monitor to and between a first end and an opposite second end, and
- a cursor operative for highlighting one of the plurality of menu items or submenu items displayed on the display monitor,
- wherein said sensor is operative, in conjunction with the display monitor and the controller, in a sliding contact mode and a touch-tapping mode such that, in the sliding contact mode, a user's finger contacts either the sensor or the side surface of the display monitor at or adjacent the first end and the user's finger slides therealong in touching contact therewith until at or adjacent the second end to move the cursor between and among consecutive ones of the plurality of menu items in order to highlight a selected one of the plurality of menu items and, in the touch-tapping mode, the user taps either the sensor or the side surface of the display monitor with the user's finger at the first end or at the second end or anywhere between the first and second ends to move the cursor from a highlighted selected one of the plurality of menu items to highlight a selected one of the subset of menu items associated with the previously-highlighted selected one of the plurality of menu items and wherein the sensor includes an elongated, thin-belt member having a thin-belt member surface, a common electrode and a detector electrode, the common electrode and the detector electrode being fabricated from electrically-conductive material and connected to the thin-belt member surface of the thin-belt member, the common electrode having an elongated common electrode base member and a plurality of common electrode stem members integrally connected to the common base member, extending perpendicularly therefrom and disposed apart from one another to form respective spaces between consecutive ones of the plurality of common electrode stem members, the detector electrode having an elongated detector electrode base member extending parallel to the elongated common electrode base member and a plurality of spaced-apart detector electrode stem members integrally connected to the detector electrode base member and extending perpendicularly therefrom such that respective ones of the detector electrode stem members extend partially into respective ones of the spaces between consecutive ones of the plurality of common electrode stem members.

2. An input apparatus as set forth in claim 1, wherein plurality of menu items and submenu items are displayed in text format only and, when the user's finger contacts the sensor at or adjacent the first end, only initial ones of the plurality of menu items displayed in text format only appear on the display monitor and, when the user's finger slides therealong in touching contact therewith until at or adjacent the second end, remaining ones of the plurality of menu items displayed in text format only are displayed with ending ones of the plurality of menu items displayed in text format only appearing on the display monitor with the cursor highlighting consecutive ones of the plurality of menu items displayed in text format only as the user's finger slides therealong.

3. The input apparatus as set forth in claim 2, wherein, when the user taps the sensor, an operation function of the highlighted selected one of the plurality of submenu items displayed in text format only is executed.

4. The input apparatus as set forth in claim 1, wherein the information terminal device is one of a wrist watch and a digital camera.

* * * * *